(12) United States Patent
Qian et al.

(10) Patent No.: US 12,190,091 B2
(45) Date of Patent: Jan. 7, 2025

(54) TECHNOLOGIES FOR OVER-THE-AIR UPDATES FOR TELEMATICS SYSTEMS

(71) Applicant: CALAMP CORP., Irvine, CA (US)

(72) Inventors: Jing Qian, Eden Prairie, MN (US); Somasundaram Ramiah, Winter Park, FL (US); Michael N. O'Brien, Chaska, MN (US); Russell E. Cook, Maple Grove, MN (US); Mark K. Anderson, Victoria, MN (US)

(73) Assignee: CalAmp Corp., Carlsbad, CA (US)

( * ) Notice: Subject to any disclaimer, the term of this patent is extended or adjusted under 35 U.S.C. 154(b) by 347 days.

(21) Appl. No.: 17/578,820

(22) Filed: Jan. 19, 2022

(65) Prior Publication Data

US 2023/0229417 A1    Jul. 20, 2023

(51) Int. Cl.
| | |
|---|---|
| G06F 9/44 | (2018.01) |
| G06F 8/65 | (2018.01) |
| G06F 21/64 | (2013.01) |
| H04L 67/00 | (2022.01) |

(52) U.S. Cl.
CPC ............... G06F 8/65 (2013.01); G06F 21/64 (2013.01); H04L 67/34 (2013.01)

(58) Field of Classification Search
CPC ........................................................ G06F 8/65
USPC ........................................................ 717/170
See application file for complete search history.

(56) References Cited

U.S. PATENT DOCUMENTS

| | | | |
|---|---|---|---|
| 8,489,271 B2 | 7/2013 | Hergesheimer et al. | |
| 8,589,910 B2 | 11/2013 | Zubas et al. | |
| 9,183,393 B2 | 11/2015 | Djabarov et al. | |
| 10,768,921 B2 | 9/2020 | Sharma | |
| 10,871,952 B2 | 12/2020 | Wang et al. | |
| 10,990,376 B2 | 4/2021 | Gandhi et al. | |
| 11,144,301 B2 | 10/2021 | Troia et al. | |
| 11,144,306 B2* | 10/2021 | Olderdissen | G06F 8/654 |
| 11,295,017 B2 | 4/2022 | Madrid et al. | |
| 11,449,327 B2 | 9/2022 | David et al. | |

(Continued)

OTHER PUBLICATIONS

SAE International Surface Vehicle Recommended Practice, "E/E Diagnostic Test Modes," SAE Standard J1979, Issued Dec. 1, 1991, 19 pgs.

(Continued)

*Primary Examiner* — Evral E Bodden
(74) *Attorney, Agent, or Firm* — Barnes & Thornburg LLP

(57) ABSTRACT

Technologies for remote firmware updates include a telematics cloud server in communication with multiple telematics devices. The server stores a compressed firmware package and a firmware manifest and firmware components from the firmware package. A telematics device sends a status update to the server and receives an acknowledgment that identifies an available firmware release. The telematics device downloads the firmware manifest, and for each firmware component, determines whether to update the firmware component. The firmware component may be a base install or a differential install. The server may flag the firmware component for a forced install. The telematics device may evaluate a device policy or an advanced rule to determine whether to update the firmware. The telematics device may evaluate a machine learning risk model to determine whether to update the firmware. Other embodiments are described and claimed.

19 Claims, 9 Drawing Sheets

(56) References Cited

U.S. PATENT DOCUMENTS

| | | | |
|---|---|---|---|
| 11,824,900 B2* | 11/2023 | Wright | H04L 63/205 |
| 2008/0172306 A1 | 7/2008 | Schorr et al. | |
| 2009/0037904 A1* | 2/2009 | Cohen | G06F 8/65 |
| | | | 717/175 |
| 2009/0047929 A1 | 2/2009 | Chestnutt et al. | |
| 2011/0105082 A1 | 5/2011 | Haley | |
| 2011/0126189 A1* | 5/2011 | Galvin | G06F 8/61 |
| | | | 717/174 |
| 2011/0153121 A1 | 6/2011 | Minassian | |
| 2012/0028607 A1 | 2/2012 | Tengler et al. | |
| 2013/0152069 A1 | 6/2013 | Li | |
| 2014/0033188 A1 | 1/2014 | Beavers et al. | |
| 2014/0096217 A1 | 4/2014 | Lehmann | |
| 2014/0108787 A1 | 4/2014 | Ando et al. | |
| 2014/0344797 A1* | 11/2014 | Rajagopalan | G06F 8/61 |
| | | | 717/169 |
| 2016/0104123 A1 | 4/2016 | Viswanath et al. | |
| 2016/0343178 A1 | 11/2016 | Lesesky et al. | |
| 2016/0344704 A1 | 11/2016 | Stumpf et al. | |
| 2016/0344705 A1 | 11/2016 | Stumpf et al. | |
| 2017/0308075 A1 | 1/2017 | Whitaker et al. | |
| 2017/0142556 A1 | 5/2017 | Matus | |
| 2017/0214662 A1 | 7/2017 | Chu | |
| 2017/0242685 A1* | 8/2017 | Sperlich | B05B 5/0533 |
| 2017/0308705 A1 | 10/2017 | Karaginides et al. | |
| 2018/0007038 A1 | 1/2018 | Hsu et al. | |
| 2018/0061230 A1 | 3/2018 | Madigan et al. | |
| 2018/0091596 A1 | 3/2018 | Alvarez | |
| 2019/0004787 A1 | 1/2019 | Lewis et al. | |
| 2019/0036727 A1* | 1/2019 | Matson | H04L 63/1441 |
| 2019/0190923 A1 | 6/2019 | Boone et al. | |
| 2023/0112734 A1* | 4/2023 | Suryanarayana | H04L 9/3247 |
| | | | 717/170 |

OTHER PUBLICATIONS

SAE International Surface Recommended Practice, "OBD II Scan Tool," SAE Standard J1978, Issued Mar. 1, 1992, 13 pgs.

International Search Report and Written Opinion for PCT/US2023/060895 completed May 16, 2023 (7 pages).

International Preliminary Report on Patentability issued Jul. 23, 2024 in PCT/US2023/060895, 6 pages.

* cited by examiner

TECHNOLOGIES FOR OVER-THE-AIR UPDATES FOR TELEMATICS SYSTEMS

BACKGROUND

Telematics involves the integrated use of telecommunications and informatics, particularly for application in vehicles. Telematics functionality may include, but is not limited to, recording vehicle information, emergency warning systems, navigation functionality, safety warnings, and automated driving assistance. Vehicle telematics devices may process and transmit telematics data and other messages generated by a vehicle and connected devices. Such vehicles may include multiple sensors, controllers, and other peripheral devices that are produced by multiple third-party manufacturers. Typical vehicle telematics devices include device firmware for performing telematics functionality, including components such as operating systems, bootloaders, and applications. Device firmware for deployed telematics devices may be updated over-the-air using a cellular network.

SUMMARY

According to one aspect of the disclosure, a computing device for remote firmware updates includes a server interface, an update policy engine, and an update manager. The server interface is to receive an acknowledgment from a server device. The acknowledgment includes a data payload indicative of a firmware manifest and a download path. The update policy engine is to determine whether to upgrade firmware based on the data payload. The update manager is to download the firmware manifest from the server device in response to a determination to upgrade the firmware, wherein the firmware manifest is indicative of a plurality of firmware components. The update policy engine is further to determine, for a first firmware component of the plurality of firmware components, whether to upgrade the first firmware component in response to a download of the firmware manifest. The update manager is further to download the first firmware component from the download path in response to a determination to upgrade the first firmware component, and to install the first firmware component in response to a download of the first firmware component.

In an embodiment, the server interface is further to send a status report to the server device, wherein the status report is indicative of a current firmware version of the computing device. To receive the acknowledgment comprises to receive the acknowledgment from the server device in response to a sending of the status report. In an embodiment, the server interface is further to determine whether the acknowledgment comprises the data payload in response to receipt of the acknowledgment; and to determine whether to upgrade the firmware based on the data payload comprises to determine whether to upgrade the firmware in response to a determination that the acknowledgment comprises the data payload.

In an embodiment, the data payload of the acknowledgment is further indicative of a firmware release version and a firmware release checksum. In an embodiment, the firmware manifest is further indicative of a firmware name, a firmware version, and, for each of the plurality of firmware components, a firmware component name, a firmware component version, and a firmware component checksum.

In an embodiment, the firmware manifest is further indicative of a firmware component checksum for each of the plurality of firmware components; the update manager is further to verify that a first firmware component checksum of the manifest file matches the first firmware component in response to the download of the first firmware component; and to install the first firmware component further comprises to install the first firmware component in response to verification of the first firmware component checksum.

In an embodiment, the data payload of the acknowledgment is further indicative of a firmware release version; and to determine whether to upgrade firmware based on the data payload comprises to compare the firmware release version to a current firmware version of the computing device. In an embodiment, the firmware manifest is further indicative of a firmware component version for each of the plurality of firmware components; and to determine whether to upgrade the first firmware component comprises to compare a firmware component version of the firmware manifest to a current firmware component version of the computing device.

In an embodiment, the firmware manifest is further indicative of, for each firmware component of the plurality of firmware components, a firmware component version, a base component version, and a force install flag, wherein the force install flag is set or not set. In an embodiment, to determine whether to upgrade the first firmware component comprises to determine whether a first force install flag associated with the first firmware component is set; and to install the first firmware component comprises to install the first firmware component in response to a determination that the first force install flag is set.

In an embodiment, to determine whether to upgrade the first firmware component further comprises to evaluate a device policy of the computing device in response to a determination that the first force install flag is not set; and to install the first firmware component comprises to install the first firmware component in response to evaluating the device policy. In an embodiment, to evaluate the device policy comprises to determine whether the first firmware component is included in a predetermined list of allowed firmware components. In an embodiment, to evaluate the device policy comprises to evaluate an advanced rule to determine whether to allow an update of the first firmware component. In an embodiment, to evaluate the advanced rule comprises to evaluate sensor data received from a controller or a sensor coupled to the computing device. In an embodiment, to evaluate the advanced rule comprises to evaluate a processing load of the computing device. In an embodiment, to evaluate the advanced rule comprises to evaluate a network load of the computing device. In an embodiment, to evaluate the advanced rule comprises to evaluate driver behavior with the computing device. In an embodiment, to evaluate the device policy comprises to determine a security priority associated with the first firmware component. In an embodiment, to evaluate the device policy comprises to evaluate a machine learning risk model. In an embodiment, to evaluate the device policy further comprises to update the machine learning risk model with usage information collected by the computing device.

In an embodiment, to determine whether to upgrade the first firmware component comprises to: determine whether the first firmware component is a base component; and determine whether a base component version of the firmware manifest associated with the first firmware component matches a current firmware component version of the computing device in response to a determination that the first firmware component is not a base component; and to install the first firmware component comprises to install the first firmware component in response to a determination that the base component version associated with the first firmware component matches the current firmware component version. In an embodiment, to determine whether to upgrade the first firmware component further comprises to: determine whether a base image path associated with the first firmware component is included in the firmware manifest in response to the determination that the first firmware component is not a base component; and download a base image from the base image path in response to a determination that the base component version associated with the first firmware component does not match the current firmware component version and in response to a determination that the base image path is included in the firmware manifest; the update manager is further to install the base image in response to a download of the base image; and to install the first firmware component further comprises to install the first firmware component in response to installation of the base image.

According to another aspect, a method for remote firmware updates includes receiving, by the computing device, an acknowledgment from a server device, wherein the acknowledgment comprises a data payload indicative of a firmware manifest and a download path; determining, by the computing device, whether to upgrade firmware based on the data payload; downloading, by the computing device, the firmware manifest from the server device in response to a determining to upgrade the firmware, wherein the firmware manifest is indicative of a plurality of firmware components; determining, by the computing device, for a first firmware component of the plurality of firmware components, whether to upgrade the first firmware component in response to downloading the firmware manifest; downloading, by the computing device, the first firmware component from the download path in response to determining to upgrade the first firmware component; and installing, by the computing device, the first firmware component in response to downloading the first firmware component.

In an embodiment, the method further includes sending, by a computing device, a status report to the server device, wherein the status report is indicative of a current firmware version of the computing device; wherein receiving the acknowledgment comprises receiving the acknowledgment from the server device in response to sending the status report. In an embodiment, the method further includes determining, by the computing device, whether the acknowledgment comprises the data payload in response to receiving the acknowledgment; wherein determining whether to upgrade the firmware based on the data payload comprises determining whether to upgrade the firmware in response to determining that the acknowledgment comprises the data payload.

In an embodiment, the data payload of the acknowledgment is further indicative of a firmware release version and a firmware release checksum. In an embodiment, the firmware manifest is further indicative of a firmware name, a firmware version, and, for each of the plurality of firmware components, a firmware component name, a firmware component version, and a firmware component checksum.

In an embodiment, the firmware manifest is further indicative of a firmware component checksum for each of the plurality of firmware components, and the method further includes verifying, by the computing device, that a first firmware component checksum of the manifest file matches the first firmware component in response to downloading the first firmware component; wherein installing the first firmware component further comprises installing the first firmware component in response to verifying the first firmware component checksum.

In an embodiment, the data payload of the acknowledgment is further indicative of a firmware release version; and determining whether to upgrade firmware based on the data payload comprises comparing the firmware release version to a current firmware version of the computing device. In an embodiment, the firmware manifest is further indicative of a firmware component version for each of the plurality of firmware components; and determining whether to upgrade the first firmware component comprises comparing a firmware component version of the firmware manifest to a current firmware component version of the computing device.

In an embodiment, the firmware manifest is further indicative of, for each firmware component of the plurality of firmware components, a firmware component version, a base component version, and a force install flag, wherein the force install flag is set or not set. In an embodiment, determining whether to upgrade the first firmware component comprises determining whether a first force install flag associated with the first firmware component is set; and installing the first firmware component comprises installing the first firmware component in response to determining that the first force install flag is set.

In an embodiment, determining whether to upgrade the first firmware component further comprises evaluating a device policy of the computing device in response to determining that the first force install flag is not set; and installing the first firmware component comprises installing the first firmware component in response to evaluating the device policy. In an embodiment, evaluating the device policy comprises determining whether the first firmware component is included in a predetermined list of allowed firmware components. In an embodiment, evaluating the device policy comprises evaluating an advanced rule to determine whether to allow updating the first firmware component. In an embodiment, evaluating the advanced rule comprises evaluating sensor data received from a controller or a sensor coupled to the computing device. In an embodiment, evaluating the advanced rule comprises evaluating a processing load of the computing device. In an embodiment, evaluating the advanced rule comprises evaluating a network load of the computing device. In an embodiment, evaluating the advanced rule comprises evaluating driver behavior with the computing device. In an embodiment, evaluating the device policy comprises determining a security priority associated with the first firmware component. In an embodiment, evaluating the device policy comprises evaluating a machine learning risk model. In an embodiment, evaluating the device policy further comprises updating the machine learning risk model with usage information collected by the computing device.

In an embodiment, determining whether to upgrade the first firmware component comprises: determining whether the first firmware component is a base component; and determining whether a base component version of the firmware manifest associated with the first firmware component matches a current firmware component version of the computing device in response to determining that the first firmware component is not a base component; wherein installing the first firmware component comprises installing the first firmware component in response to determining that the base component version associated with the first firmware component matches the current firmware component version. In an embodiment, determining whether to upgrade the first firmware component further comprises: determining whether a base image path associated with the first firmware component is included in the firmware manifest in response to determining that the first firmware component is not a base component; downloading a base image from the base image path in response to determining that the base component version associated with the first firmware component does not match the current firmware component version and in response to determining that the base image path is included in the firmware manifest; and installing the base image in response to downloading the base image; wherein installing the first firmware component further comprises installing the first firmware component in response to installing the base image.

According to another aspect, a computing device for remote firmware updates includes a package interface, a package manager, and a storage manager. The package interface is to receive a compressed firmware package. The package manager is to decompress the compressed firmware package to generate a manifest file and a plurality of firmware components, wherein the manifest file is indicative of a firmware name, a firmware version, and, for each of the plurality of firmware components, a firmware component name, a firmware component version, and a firmware component checksum. The storage manager is to store the firmware name, the firmware version, and a firmware checksum in response to decompression of the compressed firmware package, to store the compressed firmware package and the manifest file, and to store, for each of the plurality of firmware components, a compressed firmware component based on the firmware component.

In an embodiment, the package manager is further to compress each of the plurality of firmware components to generate a compressed firmware component; and to store the compressed firmware component comprises to store the compressed firmware component in response to compression of each of the plurality of firmware components. In an embodiment, the storage manager is further to store a base version associated with the compressed firmware package, wherein the compressed firmware package is a differential update package. In an embodiment, the storage manager is further to store a force install flag associated with the compressed firmware package.

In an embodiment, the computing device further includes a device interface to receive a status report from a telematics device, wherein the status report is indicative of a current firmware version of the telematics device; to determine whether an update is available to the telematics device based on the status report and the manifest file; and to send an acknowledgment to the telematics device in response to a determination that the update is available, wherein the acknowledgment is indicative of the firmware version, the firmware checksum, the manifest file, and a download path associated with the plurality of firmware components.

In an embodiment, to determine whether the update is available to the telematics device comprises to compare the current firmware version of the telematics device to the firmware version. In an embodiment, to determine whether the update is available to the telematics device comprises to determine whether an update is scheduled for the telematics device. In an embodiment, to determine whether the update is available to the telematics device comprises to evaluate a firmware update policy.

In an embodiment, to send the acknowledgment further comprises to send a security update flag associated with the compressed firmware package. In an embodiment, to send the acknowledgment further comprises to send a base firmware version and a download path associated with the base firmware version, wherein the compressed firmware package is a differential update package.

According to another aspect, a method for remote firmware updates includes receiving, by a computing device, a compressed firmware package; decompressing, by the computing device, the compressed firmware package to generate a manifest file and a plurality of firmware components, wherein the manifest file is indicative of a firmware name, a firmware version, and, for each of the plurality of firmware components, a firmware component name, a firmware component version, and a firmware component checksum; storing, by the computing device, the firmware name, the firmware version, and a firmware checksum in response to decompressing the compressed firmware package; storing, by the computing device, the compressed firmware package and the manifest file; and storing, by the computing device, for each of the plurality of firmware components, a compressed firmware component based on the firmware component.

In an embodiment, the method further includes compressing, by the computing device, each of the plurality of firmware components to generate a compressed firmware component; wherein storing the compressed firmware component comprises storing the compressed firmware component in response to compressing each of the plurality of firmware components. In an embodiment, the method further includes storing, by the computing device, a base version associated with the compressed firmware package, wherein the compressed firmware package is a differential update package. In an embodiment, the method further includes storing, by computing device, a force install flag associated with the compressed firmware package.

In an embodiment, the method further includes receiving, by the computing device, a status report from a telematics device, wherein the status report is indicative of a current firmware version of the telematics device; determining, by the computing device, whether an update is available to the telematics device based on the status report and the manifest file; and sending, by the computing device, an acknowledgment to the telematics device in response to determining that the update is available, wherein the acknowledgment is indicative of the firmware version, the firmware checksum, the manifest file, and a download path associated with the plurality of firmware components.

In an embodiment, determining whether the update is available to the telematics device comprises comparing the current firmware version of the telematics device to the firmware version. In an embodiment, wherein determining whether the update is available to the telematics device comprises determining whether an update is scheduled for the telematics device. In an embodiment, determining whether the update is available to the telematics device comprises evaluating a firmware update policy.

In an embodiment, sending the acknowledgment further comprises sending a security update flag associated with the compressed firmware package. In an embodiment, sending the acknowledgment further comprises sending a base firmware version and a download path associated with the base firmware version, wherein the compressed firmware package is a differential update package.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale.

Where considered appropriate, reference labels have been repeated among the figures to indicate corresponding or analogous elements.

DETAILED DESCRIPTION OF THE DRAWINGS

Figure 1:
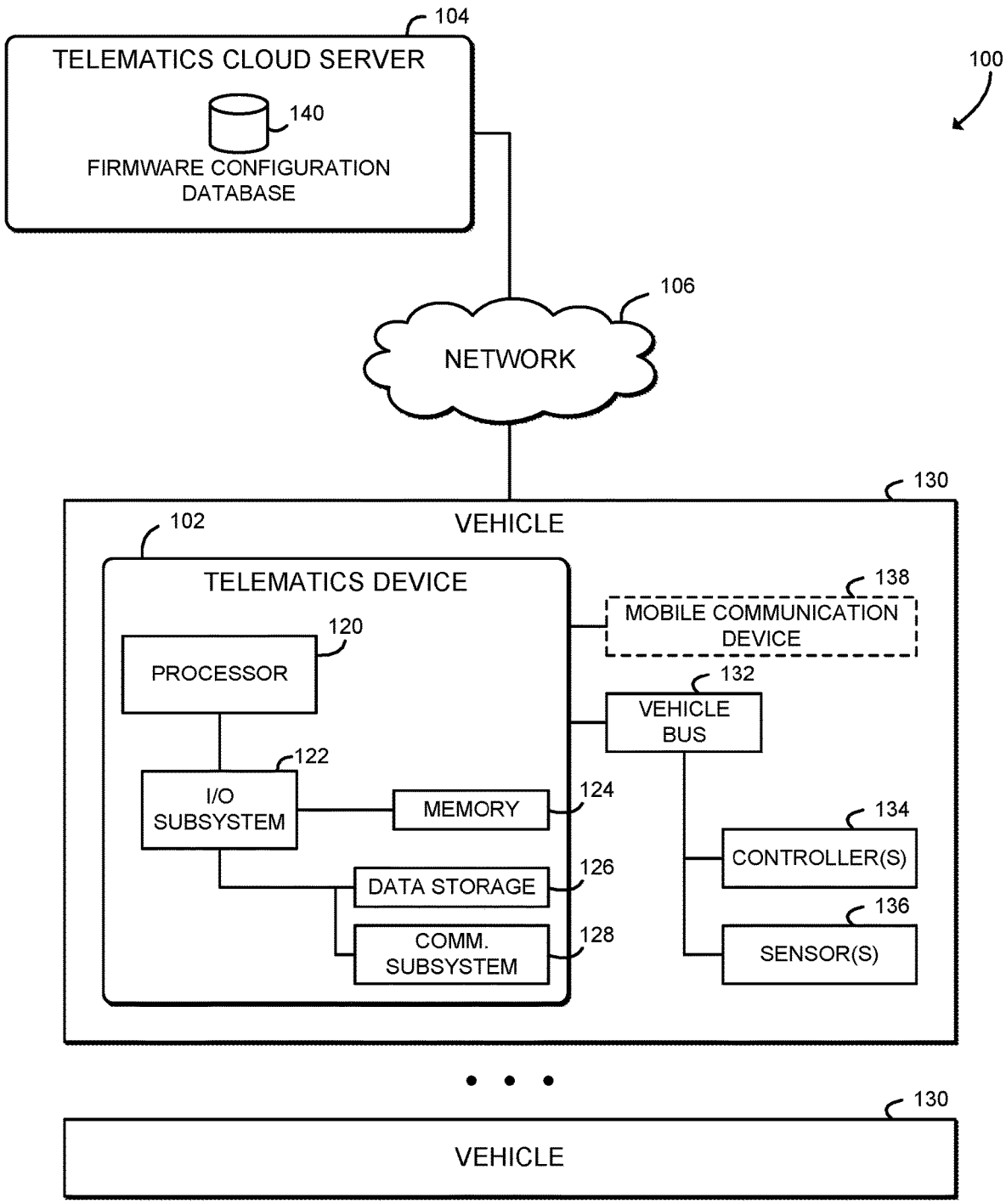
FIG. 1 is a simplified block diagram of at least one embodiment of a system for remote firmware updates for telematics devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for remote firmware updates includes multiple telematics devices 102 in communication with a telematics cloud server 104 over a network 106. In use, as described further below, a telematics device 102 contacts the telematics cloud server 104 and retrieves one or more firmware components for installation, for example to install upgrades, bug fixes, security enhancements, or other features. The telematics cloud server 104 and/or the telematics device 102 may identify certain firmware components within a firmware package for download and installation, which may reduce network bandwidth usage and increase speed of updates. Additionally, the telematics device 102 may apply one or more device policies, security policies, or more advanced rules to identify firmware components for installation. Additionally, in some embodiments, an administrator may schedule one or more mandatory or otherwise forced installations of firmware components. Thus, the system 100 also provides a powerful, flexible, and efficient system for managing firmware updates for a fleet of multiple, potentially heterogeneous telematics devices 102.

Each telematics device 102 may be embodied as any type of device capable of performing the functions described herein. For example, the telematics device 102 may be embodied as, without limitation, a mobile computing device, an embedded device, a computer, a laptop computer, a notebook computer, a tablet computer, a wearable computing device, a multiprocessor system, a network appliance, a distributed computing system, a processor-based system, and/or a consumer electronic device. As shown in FIG. 1, the illustrative telematics device 102 includes a processor 120, an I/O subsystem 122, memory 124, a data storage device 126, and a communication subsystem 128. Of course, the telematics device 102 may include other or additional components, such as those commonly found in a portable or embedded computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the telematics cloud server 104 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the telematics cloud server 104. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the telematics device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the telematics device 102 may be embodied as any communication circuit, device, or collection thereof, capable of enabling communications between the telematics device 102, the telematics cloud server 104, and/or other remote devices. The communication subsystem 128 may be configured to use any one or more communication technology (e.g., wireless or wired communications) and associated protocols (e.g., Ethernet, Bluetooth®, Bluetooth Low Energy (BLE), WiMAX, 3G LTE, 5G, etc.) to effect such communication.

As shown, each telematics device 102 is coupled to or otherwise included in a vehicle 130. Each vehicle 130 may be embodied as, without limitation, a heavy truck, a fleet vehicle, a garbage truck, a snow plow, a dump truck, a bus, a light truck, a passenger car, an airplane, a water craft, or other vehicle. Additionally or alternatively, in some embodiments, the telematics device 102 may be coupled to another asset such as a shipping pallet, a tool cage, a restricted access room, a section of the warehouse, or any other device or location that may be monitored or tracked using a telematics device 102. Illustratively, the vehicle 130 is a vehicle, and the telematics device 102 is configured to monitor operating conditions of the vehicle 130 and to communicate telematics data indicative of the operating conditions of the vehicle 130 to the telematics cloud server 104.

As shown, the illustrative vehicle 130 further includes a vehicle bus 132 that may be coupled to multiple connected devices such as controllers 134 and sensors 136. The vehicle bus 132 may be embodied as a controller area network (CAN) bus, a local area network, a wireless network, or another communications network that allows various components of the vehicle 130 and/or peripheral devices to communicate. The telematics device 102 is coupled to the vehicle bus 132. In some embodiments, the telematics device 102 may be removably coupled to the vehicle bus 132 using a vehicle diagnostic connector such as an OBD-II port of the vehicle 130. Additionally or alternatively, the telematics device 102 may be directly connected or otherwise coupled to the vehicle bus 132 with a wiring harness or other connector.

Each of the controllers 134 may be embodied as an electronic control unit (ECU), an engine controller, a vehicle controller, a microcontroller, or other embedded computing resource of the vehicle 130. Each controller 134 may provide engine telemetry, ignition signals, odometer signals, or other vehicle telemetry data over the vehicle bus 132. Each of the sensors 136 may be embodied as a location sensor (e.g., a GPS receiver), a speed sensor, a temperature sensor, an environmental sensor, a weight sensor, a vehicle- or application-specific sensor such as a snow plow position sensor, a fork lift position sensor, a tire pressure sensor, a door state sensor, or other sensor device configured to provide sensor data over the vehicle bus 132. Although illustrated in FIG. 1 as being coupled to the telematics device 102 via the vehicle bus 132, it should be understood that in some embodiments one or more of the controllers 134 and/or the sensors 136 may be coupled directly to the telematics device 102 via Bluetooth Low Energy (BLE), wireless networking (WiFi), a direct serial connection, or other connection.

In some embodiments, the vehicle 130 may include a mobile communication device 138 coupled to the telematics device 102. The mobile communication device 138 may be embodied as a cellular modem, a smartphone, a cellular telephone, an IoT gateway, an IoT router, or other device that enables communications between the telematics device 102 and one or more remote devices such as the telematics cloud server 104. Additionally or alternatively, in some embodiments the telematics device 102 may include integrated communication circuitry capable of network communication, such as the communication subsystem 128 described above.

The telematics cloud server 104 is configured to provide firmware updates to the telematics devices 102 and otherwise perform the functions described herein. As shown, the telematics cloud server 104 may include or otherwise access a firmware configuration database 140, which may store firmware binaries, packages, metadata, and any other data used by the firmware update process. The telematics cloud server 104 may be embodied as any type of computation or computer device capable of performing the functions described herein, including, without limitation, a server, a rack-mounted server, a blade server, a workstation, a network appliance, a web appliance, a desktop computer, a laptop computer, a tablet computer, a smartphone, a consumer electronic device, a distributed computing system, and/or a multiprocessor system. Additionally, in some embodiments, the telematics cloud server 104 may be embodied as a "virtual server" formed from multiple computing devices distributed across the network 106 and operating in a public or private cloud. Accordingly, although the telematics cloud server 104 is illustrated in FIG. 1 as embodied as a single computing device, it should be appreciated that the telematics cloud server 104 may be embodied as multiple devices cooperating together to facilitate the functionality described below. Thus, the telematics cloud server 104 includes components and devices commonly found in a computer or similar computing device, such as a processor, an I/O subsystem, a memory, a data storage device, and/or communication circuitry. Those individual components of the telematics cloud server 104 may be similar to the corresponding components of the telematics device 102, the description of which is applicable to the corresponding components of the telematics cloud server 104 and is not repeated herein so as not to obscure the present disclosure.

As discussed in more detail below, the telematics devices 102 and the telematics cloud server 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, stations, and switches, to facilitate communications among the devices of the system 100.

Figure 2:
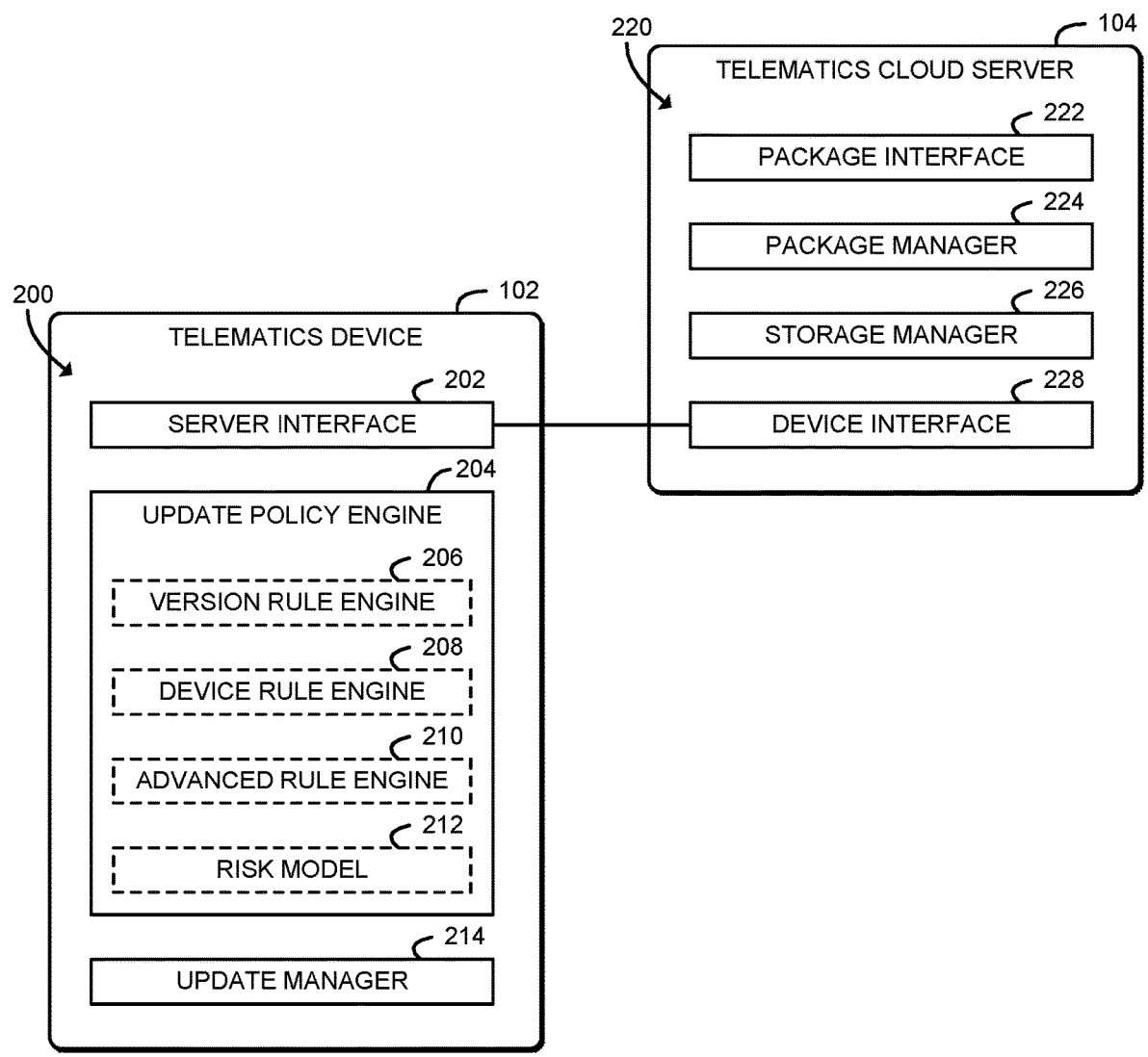
FIG. 2 is a simplified block diagram of various environments that may be established by the system of FIG. 1.

Referring now to FIG. 2, in the illustrative embodiment, a telematics device 102 establishes an environment 200 during operation. The illustrative environment 200 includes a server interface 202, an update policy engine 204, and an update manager 214. The various components of the environment 200 may be embodied as hardware, firmware, software, or a combination thereof. As such, in some embodiments, one or more of the components of the environment 200 may be embodied as circuitry or a collection of electrical devices (e.g., server interface circuitry 202, update policy engine circuitry 204, and/or update manager circuitry 214). It should be appreciated that, in such embodiments, one or more of those components may form a portion of the processor 120, the I/O subsystem 122, and/or other components of the telematics device 102.

The server interface 202 is configured to send a status report to the telematics cloud server 104. The status report is indicative of a current firmware version of the telematics device 102. The server interface 202 is further configured to receive an acknowledgment from the telematics cloud server 104 in response to sending the status report, and to determine whether the acknowledgment includes a data payload. The data payload may be indicative of a firmware manifest, a download path, a firmware release version, and a firmware release checksum. As described further below, the firmware manifest is indicative of a firmware name, a firmware version, multiple firmware components, and for each firmware component, a firmware component name, a firmware component version, and a firmware component checksum. In some embodiments, the firmware manifest may be indicative of a base component version, a base image path, and a force install flag for each firmware component.

The update policy engine 204 is configured to determine whether to upgrade firmware based on the data payload. In some embodiments, determining whether to upgrade firmware based on the data payload includes comparing the firmware release version to the current firmware version of the telematics device 102. The update policy engine 204 is further configured to determine, for each firmware component, whether to upgrade the firmware component in response to downloading the firmware manifest. In some embodiments, determining whether to upgrade each firmware component may include comparing a firmware component version of the firmware manifest to a current firmware component version of the telematics device 102.

In some embodiments, determining whether to upgrade each firmware component includes determining whether that firmware component is a base component and, if the firmware component is not a base component, determining whether a base component version of the firmware manifest associated with the first firmware component matches a current firmware component version of the telematics device 102. In some embodiments, determining whether to upgrade each firmware component further includes determining whether a base image path associated with the firmware component is included in the firmware manifest if the first firmware component is not a base component. In some embodiments, one or more of those functions may be performed by a sub-component such as a version rule engine 206.

In some embodiments, to determine whether to upgrade each firmware component includes determining whether a force install flag associated with the firmware component is set. To determine whether to upgrade the first firmware component may further include evaluating a device policy of the telematics device 102 if the force install flag is not set. Evaluating the device policy may include determining whether the firmware component is included in a predetermined list of allowed firmware components. In some embodiments, one or more of those functions may be performed by a sub-component, such as a device rule engine 208.

In some embodiments, evaluating the device policy includes evaluating an advanced rule to determine whether to allow an update of each firmware component. Evaluating the advanced rule may include evaluating sensor data received from a controller 134 or a sensor 136 coupled to the telematics device 102, evaluating a processing load of the telematics device 102, evaluating a network load of the telematics device 102, evaluating driver behavior with the telematics device 102, or determining a security priority associated with the firmware component. In some embodiments, evaluating the device policy includes evaluating a machine learning risk model, and may further include updating the machine learning risk model with usage information collected by the telematics device 102. In some embodiments, one or more of those functions may be performed by a sub-component such as an advanced rule engine 210 and/or a risk model 212.

The update manager 214 is configured to download the firmware manifest from the telematics cloud server 104 in response to determining to upgrade the firmware. The update manager 214 is further configured to download each firmware component from the associated download path in response to determining to upgrade that firmware component and to then install the firmware component. The update manager 214 may be further configured to verify that each firmware component checksum of the manifest file matches the corresponding firmware component and to install the firmware component in response to verifying the firmware component checksum. In some embodiments, the update manager 214 is configured to install each firmware component in response to determining that a corresponding force install flag is set, or to install the firmware component in response to evaluating the device policy. In some embodiments, the update manager 214 is configured to install each firmware component in response to determining that the base component version associated with the firmware component matches the current firmware component version. In some embodiments, the update manager 214 is further configured to download a base image from the base image path in response to determining that the base component version associated with the first firmware component does not match the current firmware component version and that the base image path is included in the firmware manifest. The update manager 214 may be further configured to install the base image in response to downloading the base image, and to install the firmware component in response to installing of the base image.

Still referring to FIG. 2, in the illustrative embodiment, the telematics cloud server 104 establishes an environment 220 during operation. The illustrative environment 220 includes a package interface 222, a package manager 224, a storage manager 226, and a device interface 228. The various components of the environment 220 may be embodied as hardware, firmware, software, or a combination thereof. As such, in some embodiments, one or more of the components of the environment 220 may be embodied as circuitry or a collection of electrical devices (e.g., package interface circuitry 222, package manager circuitry 224, storage manager circuitry 226, and/or device interface circuitry 228). It should be appreciated that, in such embodiments, one or more of those components may form a portion of the processor, the I/O subsystem, and/or other components of the telematics cloud server 104.

The package interface 222 is configured to receive a compressed firmware package. The compressed firmware package may be received, for example, from a user such as a developer, vendor, or other producer of an updated firmware package.

The package manager 224 is configured to decompress the compressed firmware package to generate a manifest file and multiple firmware components. The manifest file is indicative of a firmware name, a firmware version, and, for each of the firmware components, a firmware component name, a firmware component version, and a firmware component checksum. In some embodiments, the package manager 224 may be further configured to compress each of the firmware components to generate a compressed firmware component.

The storage manager 226 is configured to store the firmware name, the firmware version, and a firmware checksum in response to decompressing the compressed firmware package. The storage manager 226 is further configured to store the compressed firmware package and the manifest file. The storage manager 226 is further configured to store a compressed firmware component based on each firmware component. In some embodiments, the storage manager 226 may be further configured to store a base version associated with the compressed firmware package for a differential update package. In some embodiments, the storage manager 226 may be further configured to store a force install flag associated with the compressed firmware package.

The device interface 228 is configured to receive a status report from a telematics device 102. The status report is indicative of a current firmware version of the telematics device 102. The device interface 228 is further configured to determine whether an update is available to the telematics device 102 based on the status report and the manifest file. Determining whether the update is available to the telematics device 102 may include, in some embodiments, comparing the current firmware version of the telematics device 102 to the firmware version of the compressed firmware package, determining whether an update is scheduled for the telematics device 102, and/or evaluating a firmware update policy. The device interface 228 is further configured to send an acknowledgment to the telematics device 102 in response to determining that the update is available. The acknowledgment is indicative of the firmware version, the firmware checksum, the manifest file, and a download path associated with the firmware components. In some embodiments, sending the acknowledgment may further include sending a security update flag associated with the compressed firmware package or sending a base firmware version and a download path associated with the base firmware version for a differential update package.

Figure 3:
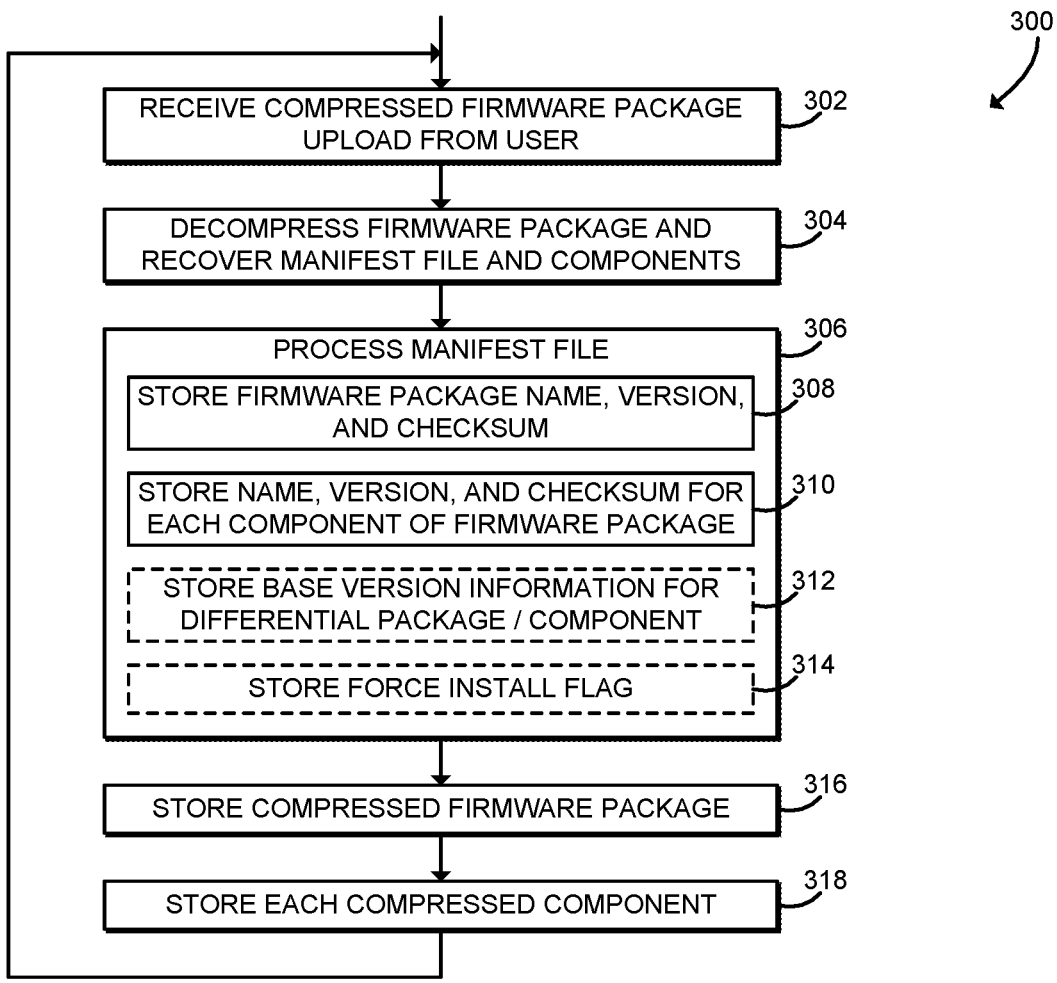
FIG. 3 is a simplified flow diagram of at least one embodiment of a method for processing a compressed firmware package that may be executed by a telematics cloud server of FIGS. 1 and 2.

Referring now to FIG. 3, in use, the telematics cloud server 104 may execute a method 300 for processing a compressed firmware package. It should be appreciated that, in some embodiments, the operations of the method 300 may be performed by one or more components of the environment 220 of the telematics cloud server 104 as shown in FIG. 2. The method 300 begins with block 302, in which the telematics cloud server 104 receives a compressed firmware package upload from a user. The compressed firmware package may include an updated firmware release, and may include all firmware components available to remote telematics devices 102.

In block 304, the telematics cloud server 104 decompresses the compressed firmware package. Decompressing the firmware package recovers a firmware manifest file and one or more firmware components included in the package. Each of the firmware components may be embodied as an image file, an archive, or another collection of firmware files. The firmware components may be stored in the compressed firmware package as individually compressed components. Each firmware component may include an operating system, bootloader, kernel, application, configuration package, or other component of the firmware release included in the firmware package.

In block 306, the telematics cloud server 104 processes the firmware manifest file received with the compressed firmware package. The firmware manifest describes the firmware package and its included firmware components. Accordingly, the firmware manifest may include a firmware name and firmware version associated with the firmware package. Additionally, the firmware manifest may include, for each firmware component of the firmware package, a firmware component name, a firmware component version, and a firmware component checksum. The telematics cloud server 104 may store such information from the firmware manifest into the firmware configuration database 140 or otherwise store that information for use in providing firmware updates to the telematics devices 102. In block 308, the telematics cloud server 104 stores the firmware name (e.g., package name), firmware version (e.g., package version), and checksum. In block 310, the telematics cloud server 104 stores the firmware component name, firmware component version, and firmware component checksum for each firmware component of the firmware package.

In some embodiments, in block 312, the telematics cloud server 104 may store base version information for a differential package or component. Differential packages or firmware components, which may also be called diff packages or delta packages, include changes from a previous, base version of the firmware package or firmware component, respectively. Thus, a differential package may have a smaller size than a corresponding base package. However, differential packages may require that a particular base firmware version already be installed on the telematics device 102; thus, a differential package may not be used to upgrade from other versions of installed firmware. Additionally, unlike base packages, a differential package may not be used to perform a "clean" install or otherwise install onto a blank device. The telematics cloud server 104 may store the base version information in any appropriate format, tag, or other data field of the manifest. For example, in the illustrative embodiment, each manifest file includes a base version number tag. Continuing that example, for differential packages, the base version number is different from the version of the firmware package or firmware component, and for base packages (i.e., packages that are not differential packages), the base version number is the same as the version of the firmware package or firmware component.

In some embodiments, in block 314 the telematics cloud server 104 may store a force install flag associated with the firmware package and/or the firmware component. As described further below, when the force install flag is set, a telematics device 102 may install a firmware update regardless of the version of firmware currently installed. The force install flag may be set, for example, in response to a scheduled firmware upgrade, in response to a security update, in response to a manual command from an administrator, or otherwise. In some embodiments, the forced install flag may be an indication of dependencies between separate firmware objects. For example, a certain firmware object may require another object to be upgraded to a minimum version in order to work correctly. Thus, the forced install flag may be used to manage dependencies for such firmware objects. In addition to the forced install flag, and as described further below, each telematics device 102 may evaluate various device policies in order to determine when a particular update may occur. In response to the forced install flag, a telematics device 102 may ignore some or all of the device policies depending on the device and the policy set. For example, a telematics device 102 running on internal battery power may require a certain battery capacity in order to upgrade firmware, and such policy should not be ignored.

In block 316, the telematics cloud server 104 stores the compressed firmware package. The compressed firmware package may be stored with a network storage location, a file server, a web server, or other location that is accessible to the telematics devices 102, such as the firmware configuration database 140. In particular, the compressed firmware package may be accessible at a download path such as a uniform resource indicator (URI), uniform resource locator (URL), or other network address. As described further below, when upgrading the firmware, a telematics device 102 may download the compressed firmware package from the download path.

Similarly, in block 318 the telematics cloud server 104 stores each compressed firmware component. Each compressed firmware component may be stored with a network storage location, a file server, a web server, or other location that is accessible to the telematics devices 102, such as the firmware configuration database 140. In particular, each compressed firmware component may be accessible at a download path such as a URI, URL, or other network address that may be determined based on the address of the compressed firmware component. As described further below, when upgrading the firmware, a telematics device 102 may download one or more of the compressed firmware components from the corresponding download path. After storing each compressed firmware component, the method 300 loops back to block 302, in which the telematics cloud server 104 may receive additional compressed firmware packages from a user.

Figure 4:
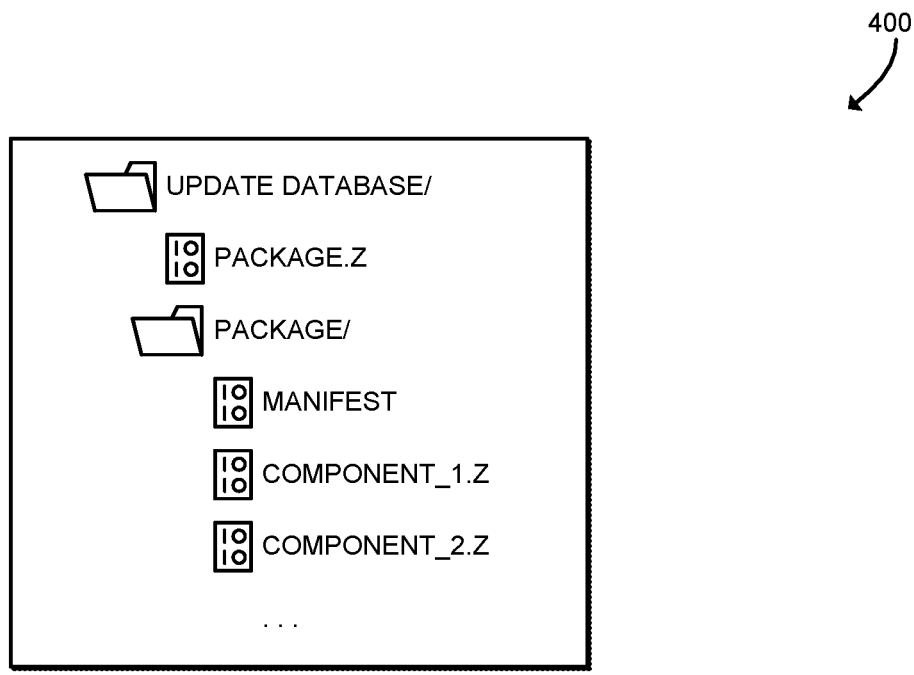
FIG. 4 is a schematic diagram of firmware components that may be stored by the telematics cloud server of FIGS. 1 and 2.

Referring now to FIG. 4, diagram 400 illustrates one potential configuration of a compressed firmware package and compressed firmware components that may be stored by the telematics cloud server 104. As shown, the telematics cloud server 104 may establish an update database root folder that contains a compressed firmware package (illustratively named PACKAGE.Z). The update database root folder includes an additional folder with the name of the firmware package (i.e., PACKAGE). That package folder includes the MANIFEST file as well as multiple compressed firmware component files (i.e., COMPONENT_1.Z, COMPONENT_2.Z, etc.). A telematics device 102 may use a download path associated with the update database root folder and the storage structure shown in FIG. 4 to construct a URI/URL for the compressed package, the manifest file, and each compressed component. Of course, it should be understood that in other embodiments, the firmware components and/or the firmware package may be stored using any appropriate storage technique and/or organization.

Figure 5:
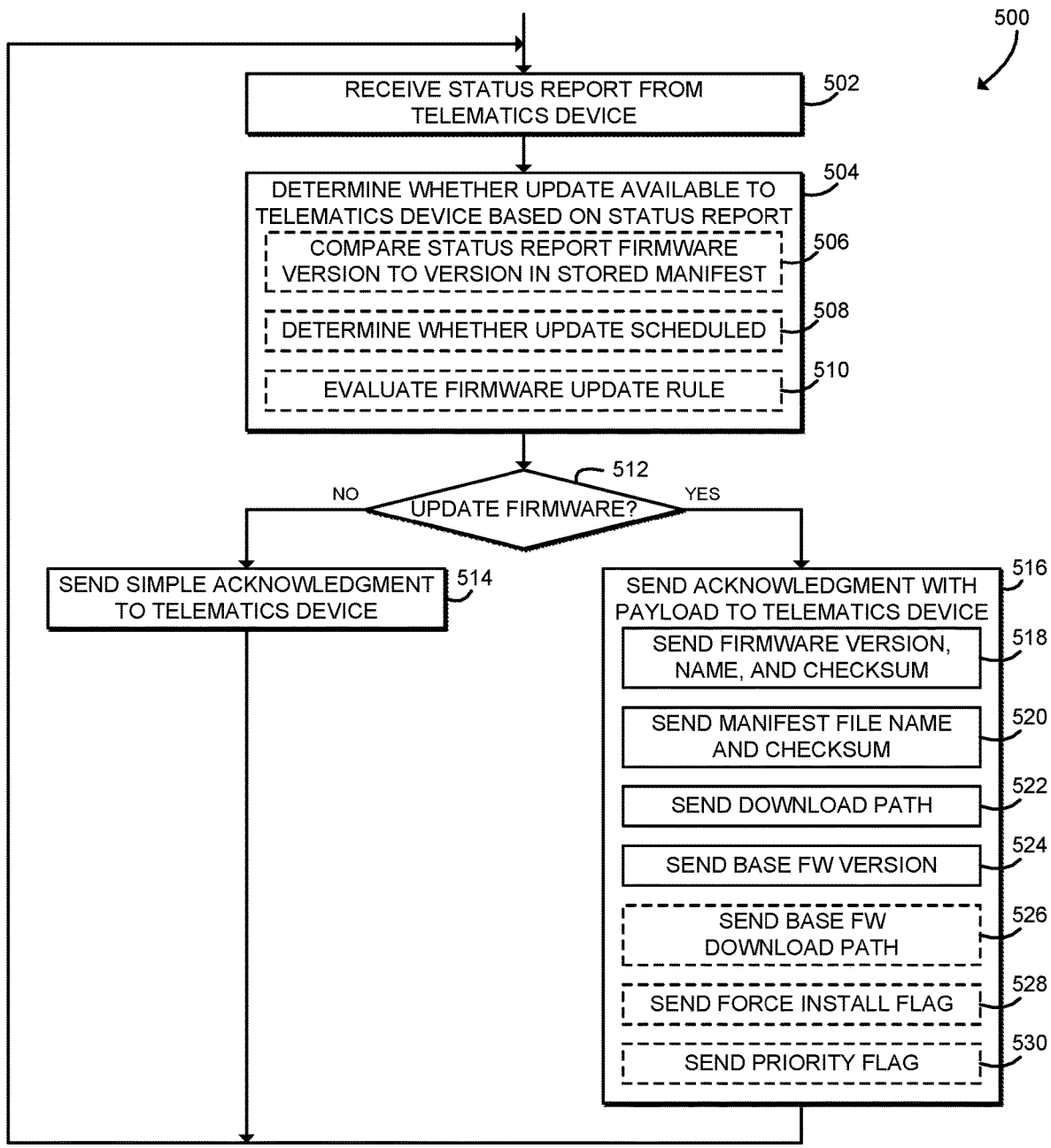
FIG. 5 is a simplified flow diagram of at least one embodiment of a method for providing firmware updates to a remote telematics device that may be executed by a telematics cloud server of FIGS. 1 and 2.

Referring now to FIG. 5, in use, the telematics cloud server 104 may execute a method 500 for providing firmware updates to a remote telematics device 102. It should be appreciated that, in some embodiments, the operations of the method 500 may be performed by one or more components of the environment 220 of the telematics cloud server 104 as shown in FIG. 2. The method 500 begins with block 502, in which the telematics cloud server 104 receives a status report from a telematics device 102. The status report includes or is otherwise indicative of a current firmware version of the telematics device 102. For example, the status report may indicate a version number for a firmware package or other release installed on the telematics device 102 and/or may include one or more version numbers for firmware components currently installed on the telematics device 102 (e.g., operating system, kernel, bootloader, application, or configuration version numbers).

In block 504, the telematics cloud server 104 determines whether to make a firmware update available to the telematics device 102 based on the received status report. The telematics cloud server 104 may make the firmware update available in response to evaluating one or more device policies or other rules that indicate when the firmware should be updated. In some embodiments, in block 506 the telematics cloud server 104 may compare the firmware version included in the status report to the firmware version stored in an associated manifest file. The telematics cloud server 104 may update the firmware, for example, if the version included in the manifest file is greater than the version reported in the status report. In some embodiments, the telematics cloud server 104 may determine whether a firmware update has been scheduled. The firmware update may be scheduled for a particular telematics device 102, for all telematics devices 102, or otherwise configured. In some embodiments, in block 510 the telematics cloud server 104 may evaluate one or more additional firmware update rules. For example, the telematics cloud server 104 may evaluate a device policy such as a component whitelist or other configuration data. As another example, the telematics cloud server 104 may evaluate one or more advanced rules based on sensor data received by the telematics data 102, driver behavior, risk model outputs, or other data. Those evaluations are similar to advanced rules that may be evaluated by the telematics device 102, described further below.

In block 512, the telematics cloud server 104 checks whether to update the firmware. If so, the method 500 branches to block 516, described below. If the telematics cloud server 104 determines not to update the firmware, the method 500 branches to block 514, in which the telematics cloud server 104 sends a simple acknowledgment to the telematics device 102 in response to the status report. After sending the acknowledgment, the method 500 loops back to block 502 to continue receiving status reports from telematics devices 102.

Referring back to block 512, if the telematics cloud server 104 determines to update the firmware, the method 500 branches to block 516, in which the telematics cloud server 104 sends an acknowledgment with a data payload to the telematics device 102 in response to the status update. The data payload includes information that may be used by the telematics device 102 to locate the updated firmware and determine whether to update the firmware package and/or any of its firmware components. In block 518, the telematics cloud server 104 sends a firmware version, firmware name, and checksum in the data payload. In block 520, the telematics cloud server 104 sends a manifest file name and checksum in the data payload. In block 522, the telematics cloud server 104 sends a download path in the data payload. The download path may identify an update database root folder as shown in FIG. 4 or otherwise identify the firmware package and/or the firmware components.

In block 524 the telematics cloud server 104 sends a base firmware version in the data payload. The base firmware version may identify the compatible base version associated with a differential firmware package and/or differential firmware component For a base firmware package or a base firmware component, the base firmware version included in the data payload matches the firmware version included in the data payload. In some embodiments, in block 526 the telematics cloud server 104 may send a download path in the data payload. The download path identifies a network location for a base firmware package of the base version identified in the data payload. As described further below, the telematics device 102 may download the base firmware package in order to perform a differential upgrade.

In some embodiments, in block 528 the telematics cloud server 104 may send a force install flag in the data payload. The force install flag may be evaluated by a version rule engine of the telematics device 102. For example, if the available firmware version is the same or lower than firmware currently installed on the telematics device 102 and the force install flag is set, the telematics device 102 may download and install the available firmware. Thus, the telematics device 102 may perform firmware reinstallations, downgrades, or other operations. In some embodiments, in block 530 the telematics cloud server 104 may send a priority flag in the data payload. The priority flag may indicate that the firmware update includes a high priority update, such as a correction for a security vulnerability or other security content, a fix for a critical bug, such as a bug that may cause the telematics device 102 to be inoperable or lose network connectivity, or another critical update. As described further below, the telematics device 102 may evaluate the data payload including the optional force install flag and/or the optional priority flag using various device policies and/or risk models to determine whether to apply the firmware update. After sending the acknowledgment, the method 500 loops back to block 502 to continue receiving status reports from telematics devices 102.

Figure 6:
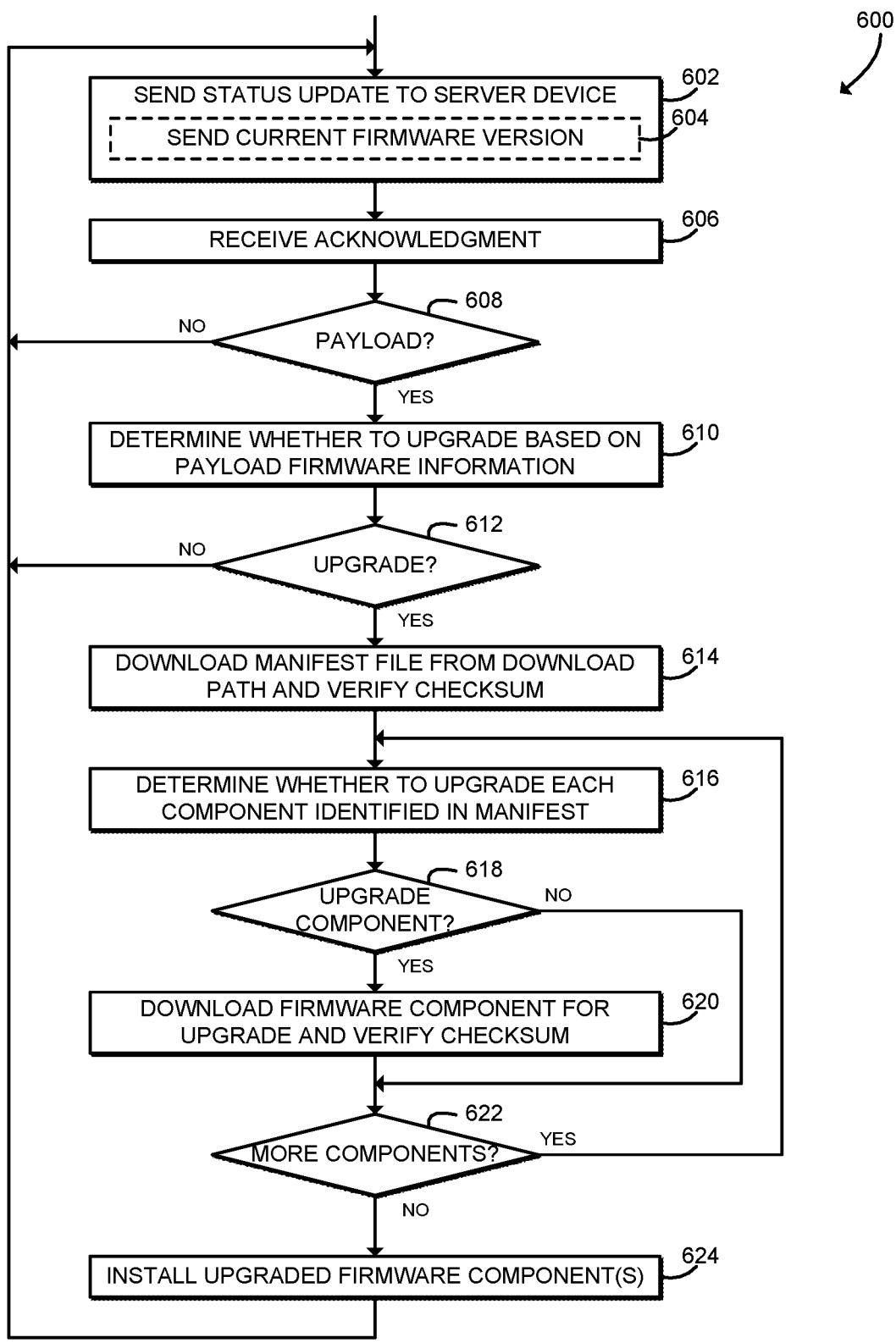
FIG. 6 is a simplified flow diagram of at least one embodiment of a method for updating device firmware that may be executed by a telematics device of FIGS. 1 and 2.

Referring now to FIG. 6, in use, the telematics device 102 may execute a method 600 for updating device firmware. It should be appreciated that, in some embodiments, the operations of the method 600 may be performed by one or more components of the environment 200 of the telematics device 100 as shown in FIG. 2. The method 600 begins with block 602, in which the telematics device 102 sends a status update to the telematics cloud server 104. The telematics device 102 may, for example, send periodic status reports or otherwise continue to send status reports while operational. In some embodiments, in block 604 the telematics device 102 may send a current firmware version of the telematics device 102. For example, the status report may indicate a version number for a firmware package or other release installed on the telematics device 102 and/or may include one or more version numbers for firmware components currently installed on the telematics device 102 (e.g., operating system, kernel, bootloader, application, or configuration version numbers).

In block 606, the telematics device 102 receives an acknowledgment from the telematics cloud server 104. In block 608, the telematics device 102 determines whether the acknowledgment includes a data payload. As described above, the acknowledge may be a simple acknowledgment without a data payload, or the acknowledgment may include a data payload including information that may be used to locate updated firmware and to determine whether to update a firmware package and/or any of its firmware components. If the acknowledgment does not include a data payload, the method 600 loops back to block 602 to continue sending status reports to the telematics cloud server 104. If the acknowledgment includes a data payload, the method 600 advances to block 610.

In block 610, the telematics device 102 determines whether to upgrade based on firmware information included in the data payload. For example, the telematics device 102 may compare the firmware version included in the data payload to the current firmware version of the telematics device 102. Additionally or alternatively, the telematics device 102 may evaluate one or more device policies, advanced rules, or other rules to determine whether to update firmware as describe below in connection with the methods of FIGS. 7-8 and FIG. 9.

In block 612, the telematics device 102 checks whether to upgrade the firmware. If not, the method 600 loops back to block 602 to continue sending status reports to the telematics cloud server 104. If the telematics device 102 determines to upgrade the firmware, the method 600 advances to block 614.

In block 614, the telematics device 102 downloads the manifest file from the telematics cloud server 104 and verifies a checksum associated with the manifest file. As described above, the firmware manifest describes a firmware package and its included firmware components. Accordingly, the firmware manifest may include a firmware name and firmware version associated with the firmware package. Additionally, the firmware manifest may include, for each firmware component of the firmware package, a firmware component name, a firmware component version, and a firmware component checksum. The telematics device 102 may verify a checksum associated with the manifest file in order to ensure that the manifest file has been downloaded correctly and is unaltered.

In block 616, the telematics device 102 determines whether to upgrade each firmware component identified in the firmware manifest. For example, the telematics device 102 may compare the firmware component version included in the firmware manifest to the current firmware component version of corresponding component installed on the telematics device 102. Additionally or alternatively, the telematics device 102 may evaluate one or more device policies, advanced rules, or other rules to determine whether to update firmware as describe below in connection with the methods of FIGS. 7-8 and FIG. 9.

In block 618, the telematics device 102 checks whether to upgrade the firmware component. If not, the method 600 branches ahead to block 622, described below. If the telematics device 102 determines to upgrade the firmware component, the method 600 advances to block 620.

In block 620, the telematics device 102 downloads the firmware component for the upgrade and verifies an associated firmware component checksum. The firmware component checksum may be included, for example, in the firmware manifest as described above. Verifying the checksum may ensure that the firmware component has been downloaded correctly and is unaltered.

In block 622, the telematics device 102 determines whether additional firmware components identified in the firmware manifest remain for processing. If so, the method 600 loops back to block 616 to continue determining whether to upgrade each firmware component. If no additional firmware components remain, the method 600 advances to block 624.

In block 624, the telematics device 102 installs any firmware components that were identified for upgrade. The telematics device 102 may use any appropriate technique to install the downloaded firmware components. Illustratively, the downloaded firmware components may be base components or differential components. In some embodiments, and as described further below, the telematics device 102 may also download and install an appropriate base component before installing a differential component. After installing the upgraded firmware components, the method 600 loops back to block 602 to continue sending status updates to the telematics cloud server 104.

Figure 7:
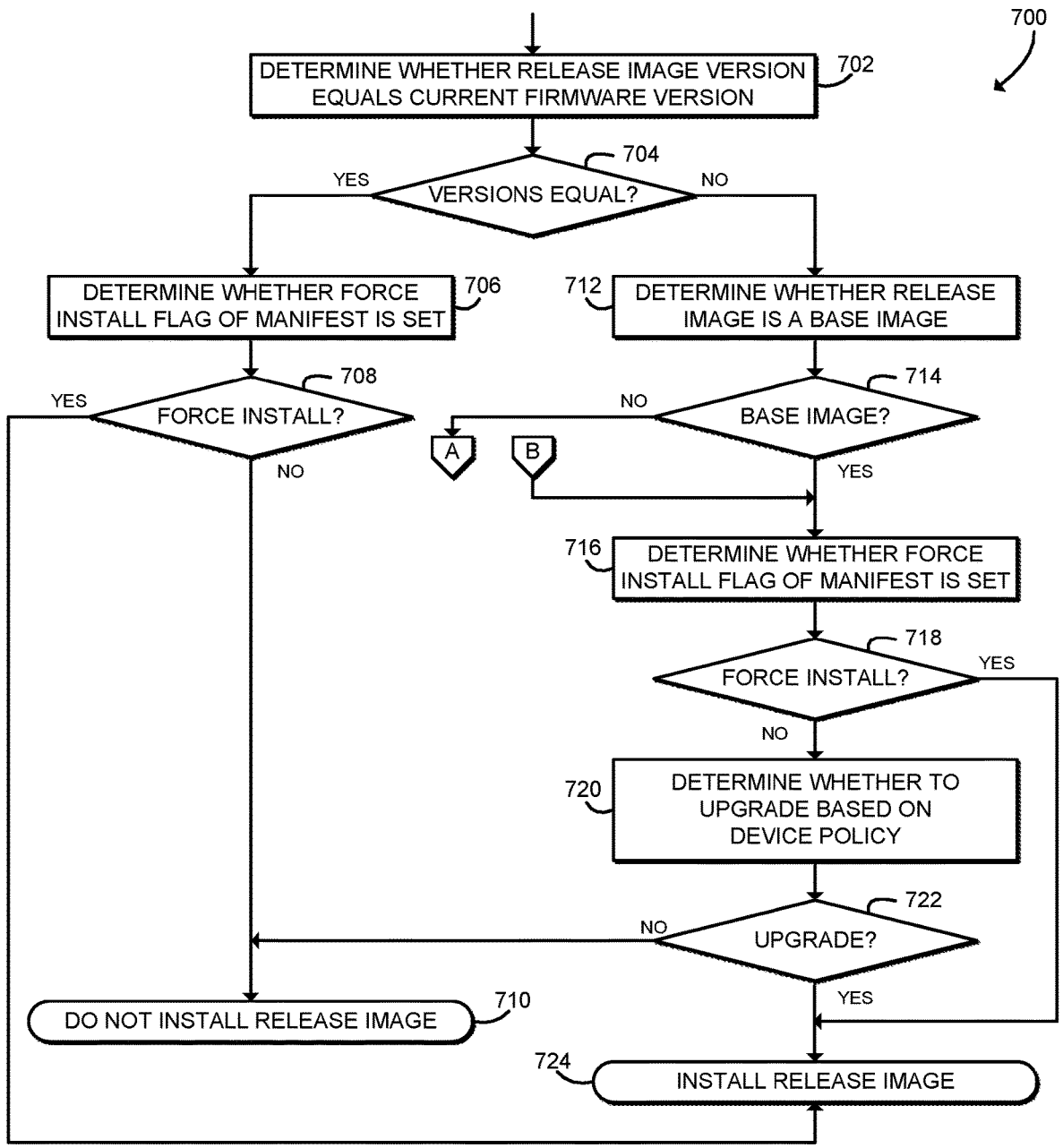
FIGS. 7 and 8 are a simplified flow diagram of at least one embodiment of a method for processing firmware images that may be executed by a telematics device of FIGS. 1 and 2.
Figure 8:
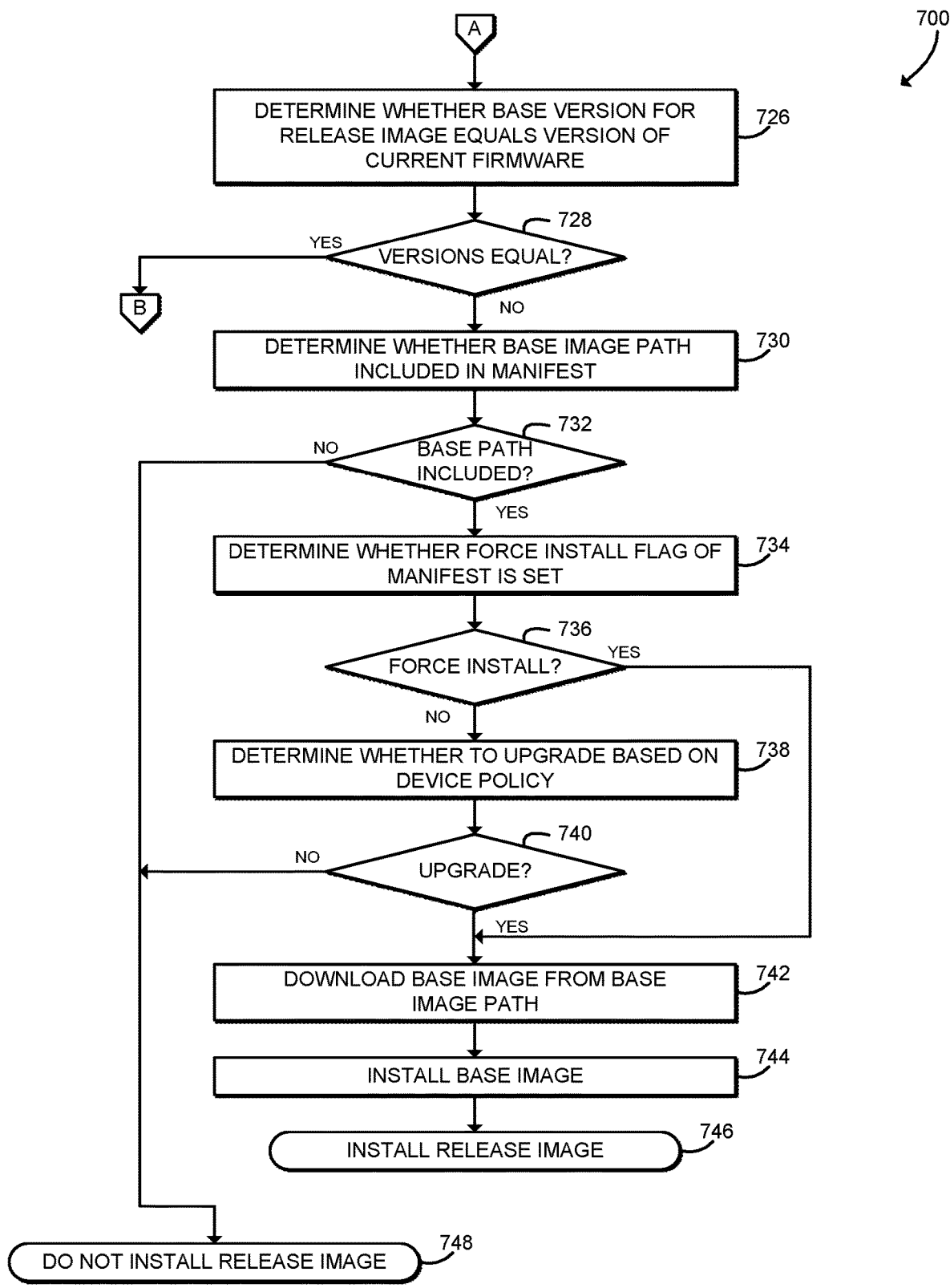

Referring now to FIGS. 7 and 8, in use, the telematics device 102 may execute a method 700 for processing firmware images. It should be appreciated that, in some embodiments, the operations of the method 700 may be performed by one or more components of the environment 200 of the telematics device 100 as shown in FIG. 2. The method 700 may be executed in connection with determining whether to install a firmware package and/or a firmware component as described above in connection with blocks 610, 616 of FIG. 6. The method 700 begins with block 702, in which the telematics device 102 determines whether a release image version equals a current firmware version of the telematics device 102. The telematics device 102 may determine, for example, whether the version of a release image received from the telematics cloud server 104 (e.g., a firmware package version or a firmware component version) equals the version of the currently installed firmware package and/or firmware component as appropriate. In block 704, the telematics device 102 checks whether the release version and the current version are equal. If not (e.g., if the release version is greater than the current version), the method 700 branches to block 712, described below. If the release version equals the current version, the method 700 branches to block 706.

In block 706 the telematics device 102 determines whether a force install flag of the firmware manifest is set. The force install flag may be set for the firmware package and/or for each of the firmware components included in the firmware manifest. In block 708, the telematics device 102 checks whether the force install flag is set. If so, the method 700 branches to block 724, described below. If the force install flag is not set, the method 700 branches to block 710, in which the telematics device 102 determines not to install the release image. After determining not to install the release image, the method 700 is completed. The telematics device 102 may execute the method 700 again, for example to evaluate whether to upgrade additional firmware components.

Referring back to block 708, if the force install flag is set, the method 700 branches to block 724, in which the telematics device 102 determines to install the release image. The installed release image may be a firmware package or a firmware component, and the release image may be a base image or a differential image. As described above, the telematics device 102 may use any appropriate technique to install the release image. In some embodiments, and as described above in connection with FIG. 6, the telematics device 102 may install one or more downloaded release images after downloading or otherwise processing all available release images. After determining to install the image, the method 700 is completed. The telematics device 102 may execute the method 700 again, for example to evaluate whether to upgrade additional firmware components.

Referring back to block 704, if the release version and the current version are not equal, then the method 700 branches to block 712, in which the telematics device 102 determines whether the release version is a base image. The telematics device 102 may use any appropriate technique to determine whether the release image is a base image. For example, the telematics device 102 may determine whether a base version number included in the firmware manifest matches the release version included in the firmware manifest. Continuing that example, for a base image, those versions are equal. For other images (e.g., differential images or delta images), the base version number does not match the release version number. In block 714 the telematics device 102 checks whether the release image is a base image. If not (e.g., if the release image is a differential image), the method 700 branches to block 726, shown in FIG. 8 and described below. If the release image is a base image, the method 700 branches to block 716.

In block 716, the telematics device 102 determines whether a force install flag of the firmware manifest is set. As described above, the force install flag may be set for the firmware package and/or for each of the firmware components included in the firmware manifest. In block 718, the telematics device 102 checks whether the force install flag is set. If so, the method 700 branches to block 724, in which the telematics device 102 determines to install the release image as descried above. If the force install flag is not set, the method 700 branches to block 720.

In block 720, the telematics device 102 determines whether to upgrade the firmware release based on one or more device policies of the telematics device 102. Each device policy may be embodied as any rule that may be evaluated by the telematics device 102 to determine whether to upgrade the firmware release. The device policies may be configured by an administrator or otherwise deployed to each telematics device 102. For example, in an embodiment the telematics device 102 may determine whether the telematics device 102 is permitted to allow an upgrade to any release version. If not, the telematics device 102 may always reject an updated firmware release. As another example, the telematics device 102 may determine whether a release image is in a list of allowed firmware images and/or versions (e.g., a whitelist). If not included in the list, the telematics device 102 may reject the updated firmware release. Additionally or alternatively, in some embodiments the telematics device 102 may evaluate one or more device policies as described below in connection with FIG. 9 to determine whether to upgrade.

In block 722, the telematics device 102 determines whether to upgrade to the firmware release version. If not, the method 700 branches to block 710, in which the telematics device 102 determines not to install the release image as described above. If the telematics device 102 determines to upgrade to the firmware release version, the method 700 branches to block 724, in which the telematics device 102 determines to install the release image as described above.

Referring back to block 714, if the release image not a base image (e.g., if the release image is a differential image), the method 700 branches to block 726, shown in FIG. 8. In block 726, the telematics device 102 determines whether the base version for the release image equals a version of the current firmware installed on the telematics device 102. If the base version of the release image matches the version of the current firmware, then the release image is compatible with the current firmware and can be installed as a differential upgrade. For example, in some embodiments, the telematics device 102 may have currently installed both a base firmware and a differential firmware. In that example, the telematics device 102 may compare the base version of the release image to the version of the currently installed base firmware, and if those versions match, installation of the release image may proceed. Additionally or alternatively, in some embodiments the telematics device 102 may have installed only a single version of firmware. Continuing that example, the currently installed firmware may be a base firmware or a firmware that has been previously patched or otherwise updated by a differential release. In that example, if the base version of the release image matches the version of the currently installed firmware, the installation of the release image may proceed.

In block 728, the telematics device 102 determines whether the base versions are equal. If so, the method 700 branches to block 716, shown in FIG. 7, in which the telematics device 102 determines whether to install the release image as described above. Referring back to block 728, if the base versions of the release image and the current firmware are not equal, then the method 700 advances to block 730.

In block 730, the telematics device 102 determines whether a base image path is included in the firmware manifest. As described above, the base image path may be used by the telematics device 102 to download a base firmware image that is compatible with the release image. In block 732, the telematics device 102 checks whether the base image path is included in the firmware manifest. If so, the method 700 branches to block 734, described below. If the base image path is not included, the method branches to block 748, in which the telematics device 102 determines not to install the release image, similar to block 710 described above. After determining not to install the release image, the method 700 is completed. The telematics device 102 may execute the method 700 again, for example to evaluate whether to upgrade additional firmware components.

Referring back to block 732, if the base image path is included in the firmware manifest, the method 700 branches to block 734, in which the telematics device 102 determines whether a force install flag of the firmware manifest is set. As described above, the force install flag may be set for the firmware package and/or for each of the firmware components included in the firmware manifest. In block 736, the telematics device 102 checks whether the force install flag is set. If so, the method 700 branches to block 742, described below. If the force install flag is not set, the method 700 branches to block 738.

In block 738, the telematics device 102 determines whether to upgrade the firmware release based on one or more device policies of the telematics device 102. In particular, the telematics device 102 may evaluate the same policies and/or perform the same evaluations described above in connection with block 720. In block 740, the telematics device 102 determines whether to upgrade to the firmware release version. If so, the method 700 branches to block 742, described below. If the telematics device 102 determines not to upgrade to the firmware release version, the method 700 branches to block 748, in which the telematics device 102 determines not to install the release image. After determining not to install the release image, the method 700 is completed. The telematics device 102 may execute the method 700 again, for example to evaluate whether to upgrade additional firmware components.

Referring back to block 740, if the telematics device 102 determines to upgrade to the firmware release version, the method 700 branches to block 742, in which the telematics device 102 downloads a base image from the base image path. The base image may be a firmware package, a firmware component, or other firmware image that is compatible with the release image. In particular, the base version of the release image may match the firmware version of the base image. In block 744, the telematics device 102 installs the base image. As described above, the telematics device 102 may use any appropriate technique to install the base image. In block 746, after installing the base image, the telematics device 102 determines to install the release image, as described above in connection with block 724 of FIG. 7. After determining to install the image, the method 700 is completed. The telematics device 102 may execute the method 700 again, for example to evaluate whether to upgrade additional firmware components.

Figure 9:
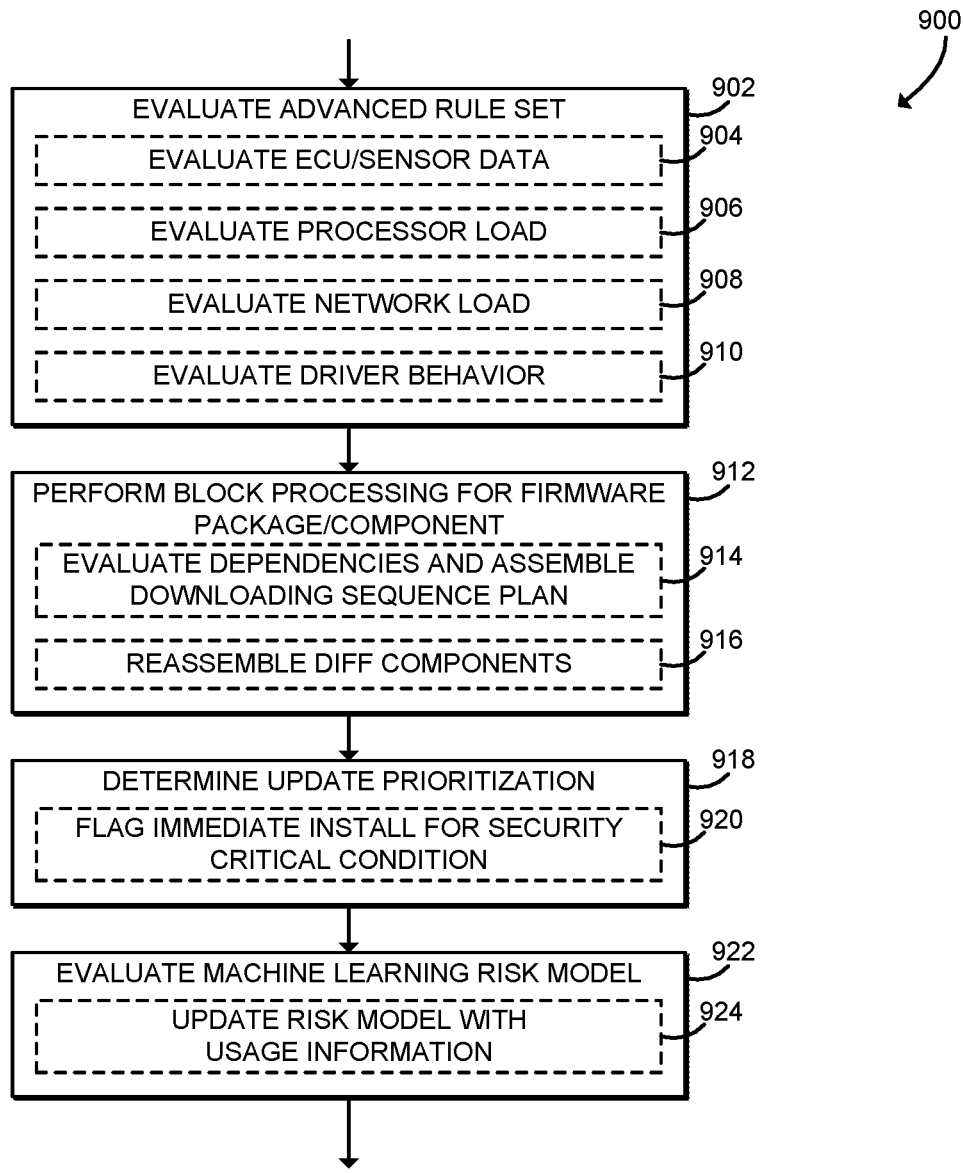
FIG. 9 is a simplified flow diagram of at least one embodiment of a method for evaluating device update policies that may be executed by the telematics device of FIGS. 1 and 2.

Referring now to FIG. 9, in use, the telematics device 102 may execute a method 900 for evaluating device update policies. It should be appreciated that, in some embodiments, the operations of the method 900 may be performed by one or more components of the environment 200 of the telematics device 100 as shown in FIG. 2. The method 900 may be executed, for example, in connection with determining whether to install a firmware package and/or a firmware component as described above in connection with blocks 610, 616 of FIG. 6. As another example, the method 900 may be executed in connection with evaluating device policy as described above in connection with block 720 of FIG. 7 and/or block 738 of FIG. 8. Additionally or alternatively, although illustrated and described as being executed by the telematics device 102, it should be understood that in some embodiments, one or more operations of the method 900 may be performed by the cloud telematics server 104.

The method 900 begins in block 902, in which the telematics device 102 may evaluate one or more advanced rules from an advanced rule set. Telematics devices 102 used in data critical applications, such as construction and school bussing, may support resilient configuration management processes such that a high quality of service is maintained. More specifically, the telematics device 102 may provide there can be no disruption of device operations or data flow during or subsequent to any over-the-air (OTA) queries, reports, programming, or other maintenance actions. Accordingly, the telematics device 102 may employ an advanced rule set and other features to determine whether to install a firmware release while maintaining high quality of service.

The advanced rule set may be configured by an administrator or otherwise deployed to the telematics device 102. Each advanced rule may be evaluated to determine whether to install a firmware release, when to install a firmware release, or otherwise adjust firmware upgrade behavior. In addition to time and operational state rules, the advanced rules may include ECU 134 or sensor 136 based rules such as RPM, speed, PTO activity. Also the advanced rules may set conditions based on network bandwidth (e.g., Cat M or 2G status), processor load, temperature extremes, or critical data processing such as accelerometer-based crash active or driver behavior processing These advanced rules may determine the telematics device 102's ability to receive, process, and instantiate an updated process or application image or script file (e.g., a firmware package, firmware component or other release). Thus, in some embodiments, in block 904 the telematics device 102 may evaluate data from one or more controllers 134 (e.g., ECUs) or sensors 136 coupled to the telematics device. In some embodiments, in block 906 the telematics device 102 may evaluate load of the processor 120. In some embodiments, in block 908 the telematics device 102 may evaluate network load, bandwidth consumption, or other network conditions. In some embodiments, in block 910 the telematics device 102 may evaluate behavior of a driver of a vehicle 130 coupled to the telematics device 102.

As described above, the advanced rule sets may be conditions established at the cloud telematics server 104 as well, such as if a telematics device 102 is determined to be in SVR mode and should restrict any remote, over-the-air (OTA) servicing to give full QoS to geospatial data or SVR beacon activation. Additional advanced rules may be built around Driver ID, I/O status, WLAN client load, or other conditions.

In block 912, the telematics device 102 performs block processing tasks for the firmware package or firmware component. In some embodiments, in block 914, the telematics device 102 may evaluate dependencies between firmware components and/or firmware packages and assemble a downloading sequence plan. Remove, over-the-air actions involving firmware delivery may involve multiple binary or script packages to multiple targets. The telematics device 102 and/or the telematics cloud server 104 may build a general OTA process model for sequencing all packages. The sequence may be based on criticality, dependency (e.g., a script is dependent upon an updated firmware image in application processor, so a third-party target device (e.g., a camera, a tag) may require an updated protocol in the application processor before the device's own application update.) As another example, a component update may be performed prior to application processor update. Each functional block may be identified in a downloading sequence plan, and each block would then carry its own advanced rule sets or process conditions. In some embodiments, in block 916 the telematics device 102 may reassemble one or more differential components. Block processing maps how a particular binary might be "chunked" into multiple elements, such as with differential or delta upgrades, and how each element/block can be built, transferred, re-assembled or reintegrated into a runtime image. The telematics device 102 may allow this process to occur at certain times or situations in order to minimize or eliminate potential disruptions. In some embodiments, the block processing may be combined with failsafe upgrade functionality.

In block 918, the telematics device 102 may determine an update prioritization associated with a firmware release. Each firmware release or other update may be assigned a level of priority, for example from highest to lowest. The advanced rule set and/or the machine learning risk model may be used to evaluate the priority of the firmware release against the current state of the telematics device 102 in order to determine whether to install the firmware release or otherwise to determine best update practice. For example, in some embodiments, an update with a patch for a critical bug that may render the telematics device 102 inoperable may be flagged as high priority, an update with a patch for a bug that is mis-counting engine hours and thus may incorrectly compute the need for maintenance may be flagged as medium priority, and a standard update with feature updates and non-critical bug fixes may have low or standard priority. In some embodiments, in block 920, the telematics device 102 may flag an immediate install or other high priority for a security critical condition or other security priority. For example, a firmware release that patches a critical security vulnerability may be installed immediately, without waiting for a scheduled status report or other scheduled update.

Thus, a particular condition which may prioritize the OTA download/scheduling/block processing functions would be a recently identified security vulnerability. In device telematics, the telematics cloud server 104 may inform telematics devices 102 that a vulnerability has been identified, it is a critical condition (e.g., severity 1), and a patch is ready for download. The advanced rule engine would prioritize this function, perhaps even informing affected telematics devices 102 that they are to suspend operations immediately to receive and process the patch. This may apply to devices 102 connected directly to assets such as vehicles 130 or critical infrastructure. Of course, in some embodiments even a high priority update such as a critical security update may be evaluated with a machine learning risk model or other device policies. For example, a device 102 operating on internal battery power that does not have sufficient power to apply an update may delay installing a critical security update until connected to main vehicle power.

In block 922, the telematics device 102 may evaluate a machine learning risk model. In some embodiments, in block 924 the telematics device 102 may update the risk model with usage information collected by the telematics device 102. In some embodiments, the telematics device 102 may build an active process running within the IoT device environment that monitors all inputs to the advanced rule sets and builds a risk model for managing OTA updates. This can be updated by an algorithm which learns over time the usage profile of a telematics device 102 and identifies operational states beyond the standard rules which should block or de-prioritize OTA download processing. For example, the risk model may identify time periods in which the telematics device 102 is typically active with accelerometer and speed processing (e.g., alignment, crash, driver behavior data processing). As another example, the risk model may predict that a rule might be triggered while a download is in process. Continuing that example, an algorithm may process sensor 136 data to determine that a speed rule may possibly be triggered, or priority accelerometer data processing based on the identified driver (Driver ID input). As yet another example, the risk model may effectively build a simple device database to track states of activity based on time-stamped events/triggers. An advanced rule can be applied to devices known for typical high levels of activity based on this database.

After performing one or more of the evaluations described above, the method 900 is completed. The computing device 102 may determine whether to upgrade a firmware component, a firmware package, or other release image based on one or more evaluations performed in connection with the method 900.

The invention claimed is:

1. A computer device for remote firmware updates, the computer device comprising:
   a server interface to receive an acknowledgment from a server device, wherein the acknowledgment comprises a data payload indicative of a firmware manifest and a download path a processor and memory configured to establish;
   an update policy engine to determine whether to upgrade firmware based on the data payload; and
   an update manager to download the firmware manifest from the server device in response to a determination to upgrade the firmware, wherein the firmware manifest is indicative of a plurality of firmware components and a firmware component version and a base component version for each of the plurality of firmware components;

wherein the update policy engine is further to determine, for a first firmware component of the plurality of firmware components and in response to a download of the firmware manifest, (i) whether the first firmware component is a base component, (ii) whether a base component version of the firmware manifest associated with the first firmware component matches a current firmware component version of the computer device in response to a determination that the first firmware component is not a base component, and (iii) whether to upgrade the first firmware component in response to a determination that the base component version associated with the first firmware component matches the current firmware component version; and the update manager is further to (i) download the first firmware component from the download path in response to a determination to upgrade the first firmware component, and (ii) install the first firmware component in response to a download of the first firmware component.

2. The computer device of claim 1, wherein:
the firmware manifest is further indicative of a firmware component checksum for each of the plurality of firmware components;
the update manager is further to verify that a first firmware component checksum of the manifest file matches the first firmware component in response to the download of the first firmware component; and
to install the first firmware component further comprises to install the first firmware component in response to verification of the first firmware component checksum.

3. The computer device of claim 1, wherein:
the data payload of the acknowledgment is further indicative of a firmware release version; and
to determine whether to upgrade firmware based on the data payload comprises to compare the firmware release version to a current firmware version of the computer device.

4. The computer device of claim 1, wherein:
to determine whether to upgrade the first firmware component comprises to compare a firmware component version of the firmware manifest to a current firmware component version of the computer device.

5. The computer device of claim 1, wherein:
the firmware manifest is further indicative of, for each firmware component of the plurality of firmware components, a force install flag, wherein the force install flag is set or not set;
to determine whether to upgrade the first firmware component comprises to determine whether a first force install flag associated with the first firmware component is set; and
to install the first firmware component comprises to install the first firmware component in response to a determination that the first force install flag is set.

6. The computer device of claim 5, wherein:
to determine whether to upgrade the first firmware component further comprises to evaluate a device policy of the computer device in response to a determination that the first force install flag is not set; and
to install the first firmware component comprises to install the first firmware component in response to evaluating the device policy.

7. The computer device of claim 6, wherein to evaluate the device policy comprises to determine whether the first firmware component is included in a predetermined list of allowed firmware components.

8. The computer device of claim 6, wherein to evaluate the device policy comprises to evaluate an advanced rule to determine whether to allow an update of the first firmware component.

9. The computer device of claim 6, wherein to evaluate the device policy comprises to determine a security priority associated with the first firmware component.

10. The computer device of claim 6, wherein to evaluate the device policy comprises to evaluate a machine learning risk model.

11. The computer device of claim 1, wherein:
to determine whether to upgrade the first firmware component further comprises to:
determine whether a base image path associated with the first firmware component is included in the firmware manifest in response to the determination that the first firmware component is not a base component; and
download a base image from the base image path in response to a determination that the base component version associated with the first firmware component does not match the current firmware component version and in response to a determination that the base image path is included in the firmware manifest;
the update manager is further to install the base image in response to a download of the base image; and
to install the first firmware component further comprises to install the first firmware component in response to installation of the base image.

12. A method for remote firmware updates, the method comprising:
receiving, by the computer device, an acknowledgment from a server device, wherein the acknowledgment comprises a data payload indicative of a firmware manifest and a download path;
determining, by the computer device, whether to upgrade firmware based on the data payload;
downloading, by the computer device, the firmware manifest from the server device in response to determining to upgrade the firmware, wherein the firmware manifest is indicative of a plurality of firmware components and a firmware component version and a base component version for each of the plurality of firmware components;
determining, by the computer device and for a first firmware component of the plurality of firmware components, whether the first firmware component is a base component in response to downloading the firmware manifest;
determining, by the computer device, whether a base component version of the firmware manifest associated with the first firmware component matches a current firmware component version of the computer device in response to a determination that the first firmware component is not a base component;
determining, by the computer device, whether to upgrade the first firmware component in response to a determination that the base component version associated with the first firmware component matches the current firmware component version;
downloading, by the computer device, the first firmware component from the download path in response to determining to upgrade the first firmware component; and installing, by the computer device, the first firmware component in response to downloading the first firmware component.

13. The method of claim 12, wherein:
the data payload of the acknowledgment is further indicative of a firmware release version; and
determining whether to upgrade firmware based on the data payload comprises comparing the firmware release version to a current firmware version of the computer device.

14. The method of claim 12, wherein:
determining whether to upgrade the first firmware component comprises comparing a firmware component version of the firmware manifest to a current firmware component version of the computer device.

15. The method of claim 12, wherein:
the firmware manifest is further indicative of, for each firmware component of the plurality of firmware components, a force install flag, wherein the force install flag is set or not set;
determining whether to upgrade the first firmware component comprises determining whether a first force install flag associated with the first firmware component is set; and
installing the first firmware component comprises installing the first firmware component in response to determining that the first force install flag is set.

16. The method of claim 15, wherein:
determining whether to upgrade the first firmware component further comprises evaluating a device policy of the computer device in response to determining that the first force install flag is not set; and
installing the first firmware component comprises installing the first firmware component in response to evaluating the device policy.

17. One or more non-transitory, computer-readable storage media comprising a plurality of instructions that in response to being executed cause a computer device to:
receive an acknowledgment from a server device, wherein the acknowledgment comprises a data payload indicative of a firmware manifest and a download path;
determine whether to upgrade firmware based on the data payload;
download the firmware manifest from the server device in response to determining to upgrade the firmware, wherein the firmware manifest is indicative of a plurality of firmware components and a firmware component version and a base component version for each of the plurality of firmware components;
determine, for a first firmware component of the plurality of firmware components, whether the first firmware component is a base component in response to downloading the firmware manifest;
determine whether a base component version of the firmware manifest associated with the first firmware component matches a current firmware component version of the computer device in response to a determination that the first firmware component is not a base component;
determine whether to upgrade the first firmware component in response to a determination that the base component version associated with the first firmware component matches the current firmware component version;
download the first firmware component from the download path in response to determining to upgrade the first firmware component; and
install the first firmware component in response to downloading the first firmware component.

18. The one or more computer-readable storage media of claim 17, wherein:
to determine whether to upgrade the first firmware component comprises to compare a firmware component version of the firmware manifest to a current firmware component version of the computer device.

19. The one or more computer-readable storage media of claim 17, wherein:
the firmware manifest is further indicative of, for each firmware component of the plurality of firmware components, a force install flag, wherein the force install flag is set or not set;
to determine whether to upgrade the first firmware component comprises to determine whether a first force install flag associated with the first firmware component is set; and
to install the first firmware component comprises to install the first firmware component in response to determining that the first force install flag is set.

* * * * *